United States Patent [19]

Steeg et al.

[11] 4,325,472
[45] Apr. 20, 1982

[54] FLYWHEEL CONNECTED TO AN INTERNAL-COMBUSTION ENGINE

[75] Inventors: Klaus Steeg, Bühl; Oswald Friedmann, Lichtenau, both of Fed. Rep. of Germany

[73] Assignee: Luk Lamellen und Kupplungsbau GmbH, Bühl, Fed. Rep. of Germany

[21] Appl. No.: 46,057

[22] Filed: Jun. 6, 1979

[30] Foreign Application Priority Data

Jun. 6, 1978 [DE] Fed. Rep. of Germany ....... 2824718

[51] Int. Cl.³ .................. F16D 13/44; F16D 21/08
[52] U.S. Cl. .................. 192/48.1; 74/572; 192/70.27; 192/89 B
[58] Field of Search ............ 192/48.1, 70.16, 70.27, 192/70.28, 89 B, 98; 180/165, 54 R; 254/185 AB; 74/572, 191

[56] References Cited

U.S. PATENT DOCUMENTS

| 657,899 | 9/1900 | Coleman | 74/191 |
|---|---|---|---|
| 1,637,734 | 8/1927 | Carhart | 192/70.27 X |
| 1,644,548 | 10/1927 | Spase | 192/70.27 X |
| 2,723,572 | 11/1955 | Bornzin | 192/48.1 X |
| 3,283,866 | 11/1966 | Giacosa | 192/89 B X |
| 3,489,256 | 1/1970 | Binder et al. | 192/89 B X |
| 3,771,311 | 11/1973 | Herbst | 180/165 X |
| 3,886,810 | 6/1975 | Sugiyama et al. | 74/572 X |
| 4,083,259 | 4/1978 | Seliger et al. | 74/191 |
| 4,122,929 | 10/1978 | Maucher et al. | 192/89 B X |

FOREIGN PATENT DOCUMENTS

987086 3/1965 United Kingdom ............. 192/70.27

Primary Examiner—Rodney H. Bonck
Attorney, Agent, or Firm—Herbert L. Lerner

[57] ABSTRACT

The combination, including a flywheel couplable to and uncouplable from an internal-combustion engine, depending upon specific circumstances, and a clutch for coupling the flywheel to and for uncoupling the flywheel from the internal-combustion engine, the clutch comprising an entrainer disc secured to a rotatable part of the internal-combustion engine against axial and rotary displacement relative thereto, the entrainer disc having two friction surfaces, a pair of pressure plates each having a respective opposing friction surface located on opposite sides of the entrainer disc, a cup spring actuatable for positively moving the pressure plates in opposite directions, the cup spring having a radially outer region operatively engageable with one of the pressure plates, and a radially inner region operatively engageable with the other of the pressure plates, an axially fixed tilting support being disposed on an axially fixed part of the flywheel, the flywheel part being mounted for relative rotation with the rotatable part of the internal-combustion engine, torque transmission means for transmitting torque between the rotatable part of the internal-combustion engine, on the one hand, and the pair of axially movable pressure plates of the clutch, and actuating means engaging the cup spring at radially inner regions thereof.

24 Claims, 7 Drawing Figures

FLYWHEEL CONNECTED TO AN INTERNAL-COMBUSTION ENGINE

The invention relates to a flywheel connected to an internal-combustion engine and, depending upon specific circumstances, being couplable to and uncouplable from the internal-combustion engine, and a clutch for coupling the flywheel to and for uncoupling the flywheel from the internal-combustion engine and, especially if the internal-combustion engine is used within a motor vehicle, another clutch such as a so-called driving clutch for engaging and disengaging the drive train with the drive gears.

Such devices for operating motor vehicles have been proposed heretofore that, during such operating circumstances wherein the drive motor does not drive the vehicle, for example, during thrust or push and idling operation, and wherein the flywheel rotates at minimal speed, the connection between the drive motor and the flywheel is broken and the motor is stopped in order to economize on fuel. The flywheel then continues to rotate as an energy storer and, at the end of the aforementioned operating circumstances or conditions, such as stopping or shutdown time and thrust or push operation, the internal-combustion engine is started up again by recoupling the flywheel thereto. To control the transmission, a second clutch, the so-called drive clutch, is provided on the flywheel.

It is accordingly an object of the invention to provide a device of the foregoing general construction which ensures trouble-free, rapid and reliable engagement and disengagement or trouble-free starting and restarting of the internal-combustion engine as well as rotation of the flywheel in uncoupled condition free of moment of inertia.

With the foregoing and other objects in view, there is provided, in accordance with the invention, in combination, a flywheel couplable to and uncouplable from an internal-combustion engine, depending upon specific circumstances, and a clutch for coupling the flywheel to and for uncoupling the flywheel from the internal-combustion engine, the clutch comprising an entrainer disc secured to a rotatable part of the internal-combustion engine against axial and rotary displacement relative thereto, the entrainer disc having two friction surfaces, a pair of pressure plates each having a respective opposing friction surface located on opposite sides of the entrainer disc, a cup spring actuatable for positively moving the pressure plates in opposite directions, the cup spring having a radially outer region operatively engageable with one of the pressure plates, and a radially inner region operatively engageable with the other of the pressure plates, an axially fixed part of the flywheel, the flywheel part being mounted for relative rotation with the rotatable part of the internal-combustion engine, torque transmission means for transmitting torque between the rotatable part of the internal-combustion engine, on the one hand, and the pair of axially movable pressure plates of the clutch, and actuating means engaging the cup spring at radially inner regions thereof.

The cup spring can be constructed and installed so as to act as a pure lever element and, by means of a tension and compression element, which engages farther radially inwardly therewith, the opposing pressing of the pressure plates is effected. In accordance with another feature of the invention, however, the cup spring is installed opposite the mounting direction thereof and has a prestress loading the pressure plates in direction toward the entrainer disc.

In accordance with a further feature of the invention, the one pressure plate is located toward the side of the internal-combustion engine and has a cage-like enlargement extending over the entrainer disc and the other pressure plate in axial direction.

In accordance with an added feature of the invention, a support of the one pressure plate for the cup spring is provided on the cage-like enlargement and extends radially inwardly as a radial continuation into the region of and over the friction surfaces.

In accordance with an additional feature of the invention, the torque transmission means are elastic in axial direction and stiff in circumferential direction so that the flywheel part, the cup spring and the pair of pressure plates from a unit rotatable relative to the rotatable part of the internal-combustion engine and the entrainer disc.

In accordance with yet another feature of the invention, the combination includes another clutch mounted on the flywheel part and forming part of the unit.

In accordance with yet a further feature of the invention, the one pressure plate has a cage-like enlargement with a radially inwardly extending continuation and the torque transmission means comprise leaf springs having fastening points for the one pressure plate located on the radially inwardly extending continuation, and the other pressure plate, is formed with dogs extending through recesses formed in the radially inwardly extending continuation, the fastening points of the leaf springs for the other pressure plate being located on the dogs.

In accordance with yet an added feature of the invention, the torque transmission means connect the one to the other pressure plate, and also the one pressure plate to the flywheel part.

In accordance with an alternate feature of the invention, the torque transmission means connect the one to the other pressure plate, and also the other pressure plate to the flywheel part.

In accordance with another feature of the invention, the torque transmission means extend from the flywheel part to the one and to the other pressure plate.

In accordance with a further feature of the invention, the torque transmission means engage the pressure plates and, simultaneously, exert a lifting force upon the pressure plates directed away from the entrainer disc.

In accordance with an added feature of the invention, the tilting support disposed on the flywheel part is displaceable in axial direction on the flywheel part.

In accordance with an additional feature of the invention, the axially displaceable tilting support is adjustable in axial direction. Trouble-free adjustment of the tilting support can then be effected so that lifting losses are avoided.

In accordance with yet another feature of the invention, screws are provided in the flywheel part and engage in the tilting support for adjusting the tilting support in axial position thereof.

In accordance with yet a further feature of the invention, an antirotation device securing the flywheel part to the tilting support is provided for preventing relative rotation therebetween, such an antirotation device being provided, for example, by engagement of the hereinaforementioned screws in recesses formed in the tilting support, which has the construction of a ring-shaped member.

In accordance with yet an added feature of the invention, one of the parts of the first-mentioned clutch (namely, either of the pressure plates thereof or the cage-like enlargement), the flywheel part or the cover of the other clutch is formed with a contact surface for a friction wheel of a starter.

In accordance with yet an additional feature of the invention, the one part formed with the contact surface for engagement with the friction wheel of the starter is a part of the flywheel and is axially fixed.

In accordance with another feature of the invention, the contact surface is conical and the friction wheel of the starter, preferably, a worm-drive starter, is correspondingly conical and is axially displaceable into engagement therewith.

In accordance with a further feature of the invention, the combination includes two security systems respectively effective in axial and in circumferential direction, security systems being fastened to the one pressure plate and form-lockingly engaging in the cage-like enlargement for mutually connecting the cage-like enlargement and the one pressure plate.

In accordance with an added feature of the invention, the security system effective in axial direction comprises a plate-like member screwed to the side of the one pressure plate facing toward the internal-combustion engine and projecting in radial direction into a groove formed in the cage-like enlargement.

In accordance with an additional feature of the invention, the security system effective in circumferential direction comprises claws screwed to the side of the one pressure plate facing toward the internal-combustion engine and extending in radial direction and engaging in radially extending slots formed in the cage-like enlargement.

In accordance with yet another feature of the invention, the clutches are located at different sides of the internal combustion engine, for example, the crankshaft of the internal-combustion engine.

Other features which are considered as characteristic for the invention, are set forth in the appended claims.

Although the invention is illustrated and described herein as embodied in flywheel connected to an internal-combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings, in which:

Figure 1:
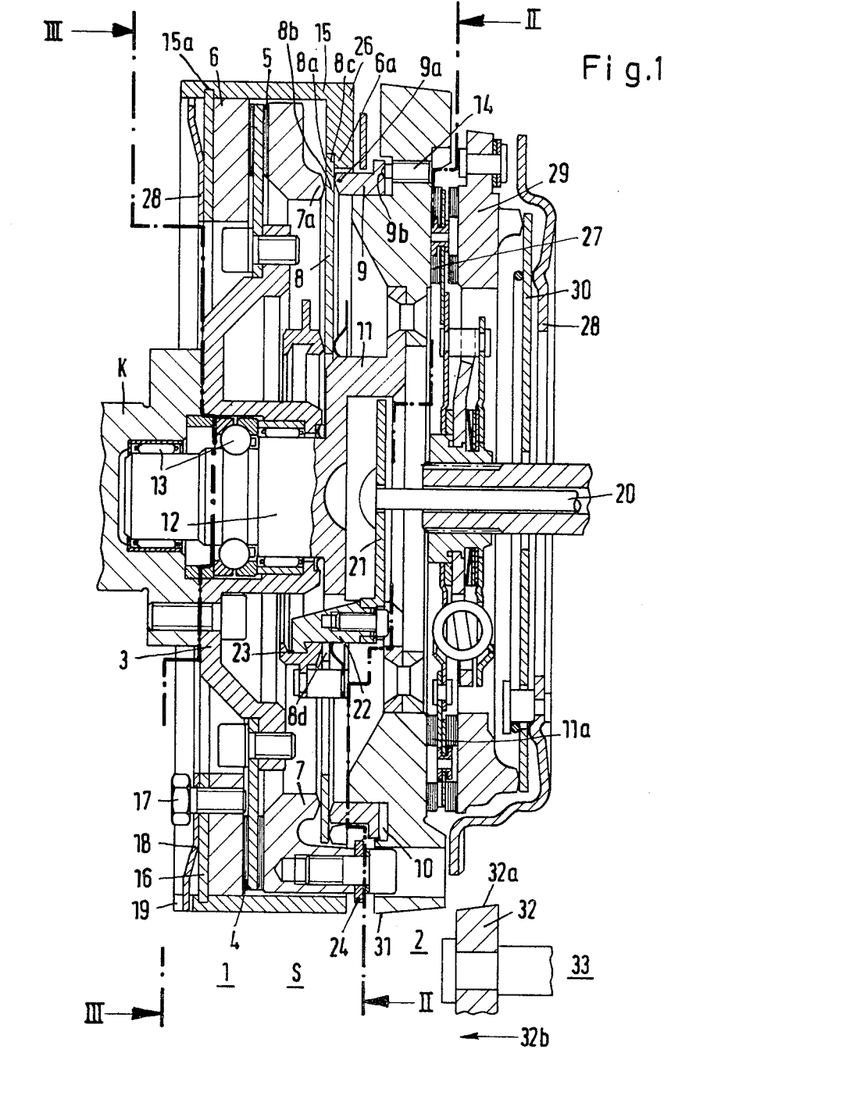
FIG. 1 is a sectional view of a couplable flywheel with a first clutch for engaging and disengaging the flywheel, and a second clutch for shifting a variable transmission or speed-changing gear.

Referring now to the drawing and first, particularly, to FIG. 1 thereof, there is shown a flywheel S which can be coupled to and decoupled from an internal-combustion engine and, more particularly, the crankshaft K of an internal-combustion engine, by means of a first clutch 1, and, more particularly, a second clutch 2 for shifting a variable transmission or change-speed gear being also shown.

On the crankshaft K, there is fastened an entrainer disc or drive plate 3 which is fixed against relative motion therewith in rotary and axial direction and which has friction linings 4 and 5, on both sides of which, a respective pressure plate, namely, a first pressure plate 6 facing toward the internal-combustion engine, and a second pressure plate 7 are disposed.

The two pressure plates 6 and 7 are forcibly movable opposite to one another by means of a cup or disc spring 8 toward and away from the friction linings 4 and 5 of the entrainer disc or drive plate 3. To this end, the cup spring 8 has a region 8a at which it is braced against an axially fixed support 9 and is pivotable about a supporting, roll-off or tilting seat 9a located thereon. The support or abutment 9 is a ring-shaped component which is provided in a recess 10 of a flywheel part 11. The flywheel part 11 is rotatable relative to the crankshaft K and the drive plate 3 by means of a journal 12 and an antifriction bearing 13, but is axially secured with respect to the crankshaft K and the drive plate 3. The support 9 with the seat 9a thereof is adjustable in axial direction by means of screws 14 which project into a recess 9b formed in the support 9, but is secured, however, in circumferential direction. The axial adjustment serves for accurately setting or positioning the tilting or tipping surface or seat 9a at the bracing region 8a of the cup spring 8.

Figure 3:
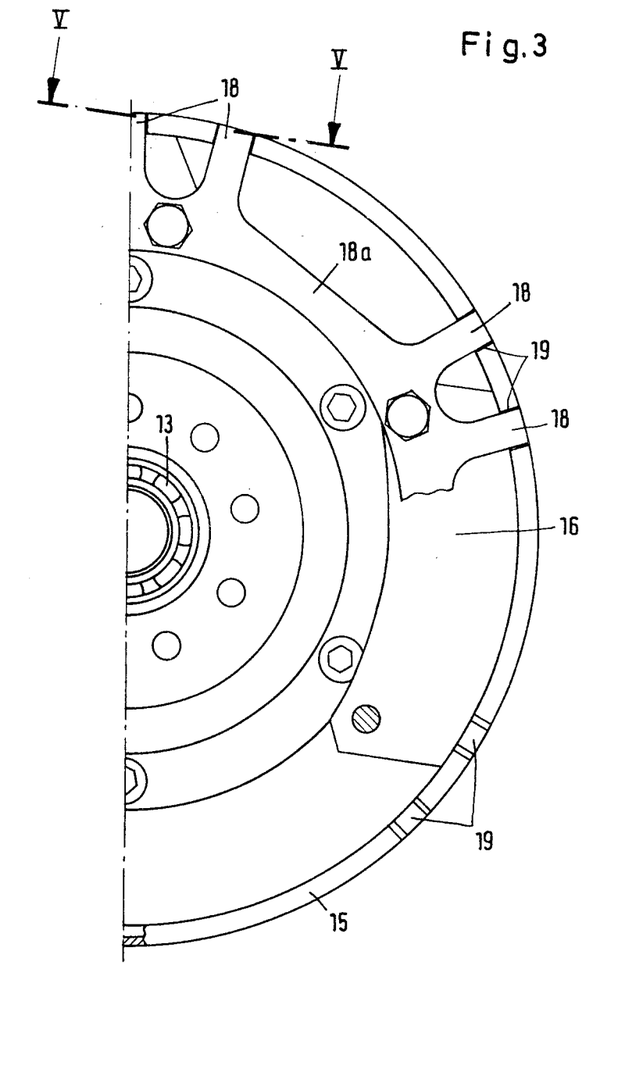
FIG. 3 is a sectional view of FIG. 1 taken along the line III—III in direction of the arrows.
Figure 5:
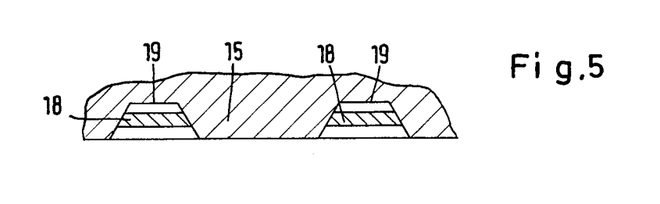
FIG. 5 is a sectional view of FIG. 3 taken along the line V—V in direction of the arrows.

The cup spring 8 is assembled in a prestressed position and, specifically, so that, with the prestressing force thereof, the pressure plate 7 as well as the pressure plate 6 is loaded or biased in direction toward the friction linings 4 and 5 of the entrainer disc or drive plate 3. To this end, the cup spring 8 has a region 8b thereof disposed radially within the tilting region 8a, by which it engages a cam or dog 7a of the second pressure plate 7 and thus subjects it as well as the second pressure plate 7 to a loading in a direction toward the friction linings 4 and 5 of the entrainer disc or drive plate 3. At a radially outer region 8c thereof, the cup spring 8 loads a support region 6a, which is provided on a cage-like extension 15 of the pressure plate 6, whereby the latter is drawn in direction toward the friction lining 4 of the entrainer disc or drive plate 3. The cage-like extension 15 is fastened to the pressure plate 6 by means of two systems of securing members, as is also apparent in connection with FIGS. 3 and 5. One of the securing systems, which is effective in axial direction, is formed of several plate-like parts 16 which are fastened by screws 17 to the pressure plate 6 and engage in a slot or groove 15a formed in the cage-like extension 15. The second securing system, which is effective in circumferential direction, is formed of several claws 18 which extend from a ring-shaped member 18a and engage in slots 19 formed in the cage-like part 15. The slots 19 are wedge-shaped and the claws 18 are formed accordingly. The claws 18 effect an axial tightening or clamping of the pressure plate 6 and the cage-like extension 15 to one another.

For disengaging the clutch 1, a tension or pull rod 20 is provided which is linked to a pressure plate 21 having attached arms 22 and a pressure piece 23 fastened thereto by which it engages behind radially inner regions 8d of the cup spring 8. If tension is exerted on the pull rod 20 to the right hand side of FIG. 1 as viewed, the cup spring 8 tips counterclockwise about the tilting support 9a i.e. the inner region 8b moves to the right-hand side and the radially outer region 8a of the cup spring 8 tilts to the left-hand side. The pressure plate 7 can thereby move toward the right-hand side and the pressure plate 6 toward the left-hand side, as viewed in FIG. 1.

Figure 2:
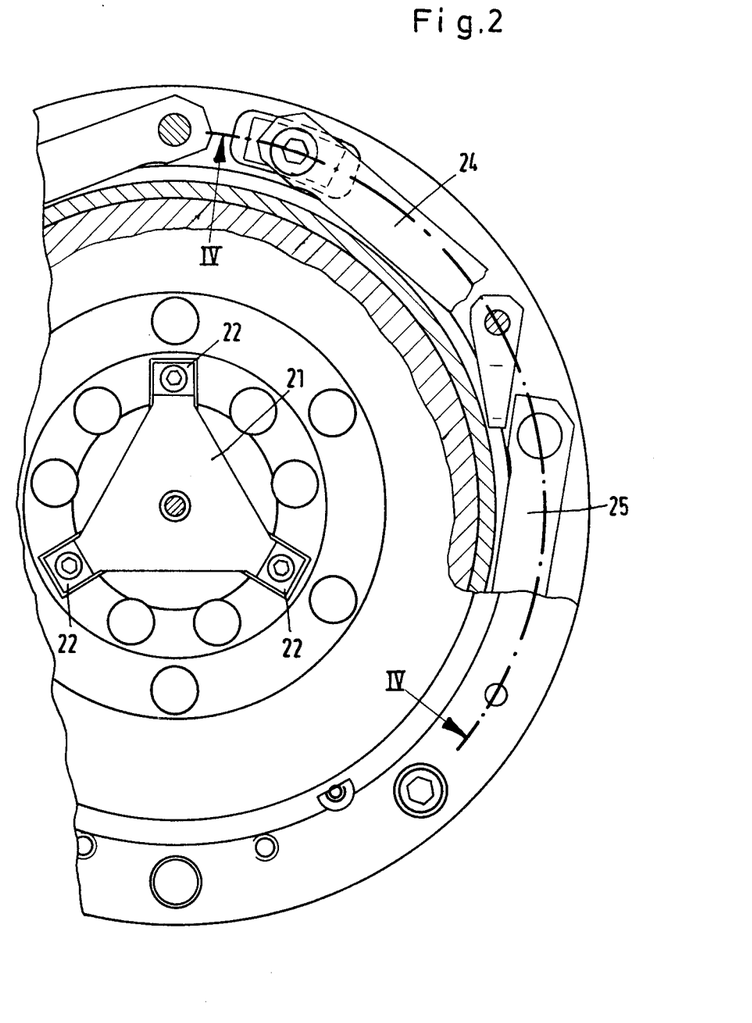
FIG. 2 is a sectional view of FIG. 1 taken along the line II—II in direction of the arrows.
Figure 4:
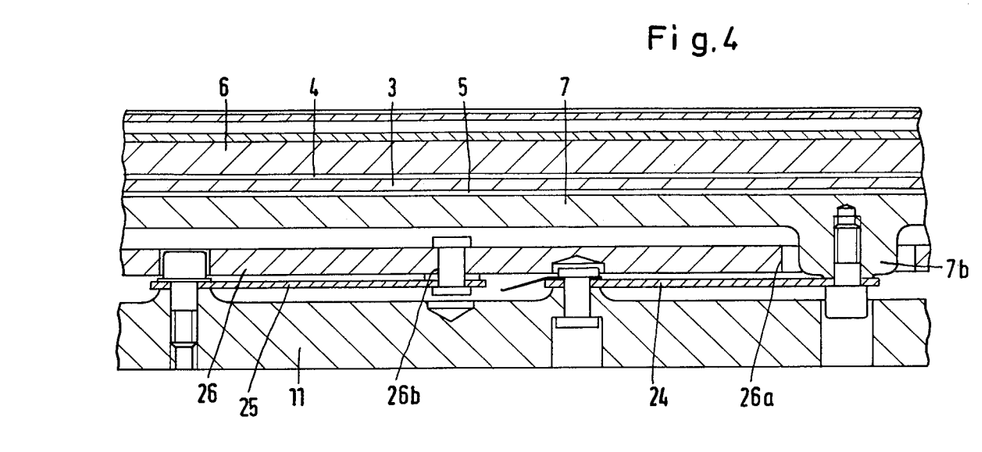
FIG. 4 is a sectional view of FIG. 2 taken along the line IV—IV in direction of the arrows.

As is evident especially from FIGS. 1, 2 and 4, the flywheel part 11 and the two pressure plates 6 and 7 of the first clutch are connected one to the other by torque transmission means in the form of leaf springs 24 and 25. As shown especially in FIG. 4, the leaf springs 24 extend from dogs or cams 7b of the pressure plate 7 which pass through a recess or cutout 26a formed in a radial continuation 26 of the cage-like extension 15 to the flywheel part 11. The leaf springs 25 connect to the radial continuation 16 to 26b and, thus, by means of the cage-like extension 15, connect the first pressure plate 6 to the flywheel part 11. The leaf springs 24 and 25 are prestressed so that, if the cup spring 8 is stress-relieved in the hereinaforedescribed manner, the pressure plates 6 and 7 are lifted off the friction linings 4 and 5.

To engage the clutch, the tension or pull rod 20 is moved to the left-hand side, as viewed in FIG. 1, the cup spring 8 is tilted or tipped clockwise about the tilting support 9 and, due to the force thereof, presses the two pressure plates 6 and 7 through the intermediary of the support 6a and 7a against the friction surfaces 4 and 5 of the entrainer disc or drive plate 3, forcibly or positively and in opposite directions.

The flywheel part 11 has one friction surface 11a for a clutch disc 27 of the second clutch 2, the housing or cover 28' of which is screwed to a surface of the flywheel part 11. The second friction surface for the clutch disc 27 is on a pressure plate 29 which is loaded or stressed in a conventional manner by a cup or disc spring 30. By actuating the non-illustrated radial tongues of the conventional cup spring 30 in direction toward the left-hand side, as viewed in FIG. 1, the clutch 2 is disengaged i.e. in the opposite direction than in the case for disengaging the clutch 1.

Figure 6:
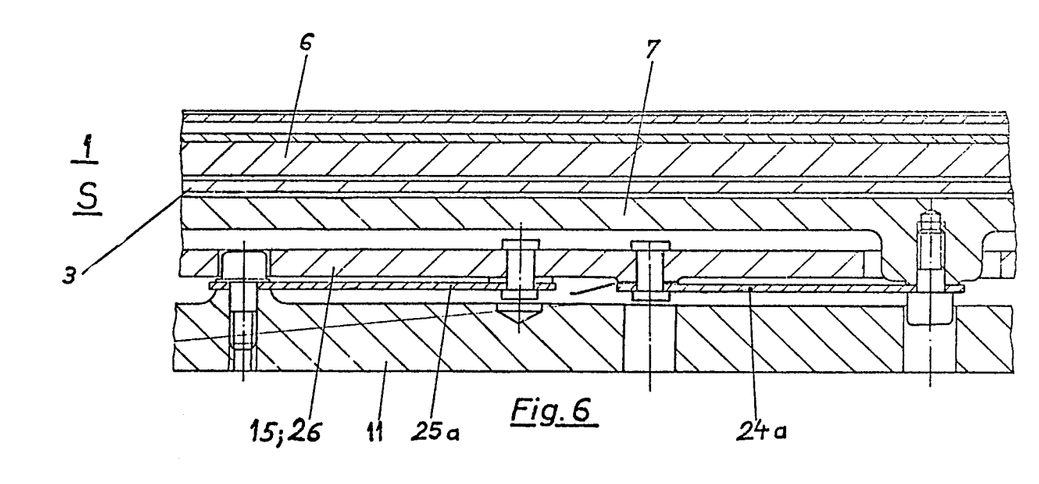
FIGS. 6 and 7 are views similar to that of FIG. 4 of modified embodiments according to the invention.

The flywheel part 11 has a conical surface 31 which serves as a run-up surface for a friction wheel 32 which likewise has a conical run-up surface 32a. The friction wheel 32 is fastened to a starter 33, not shown in detail, which is preferably a worm-drive starter. The cover 28' of the second clutch 2 is also formed with a contact surface 31a for the friction wheel of the starter. As apparent from FIG. 6, leaf springs 25a as torque transmission means connect the first pressure plate 6 to the flywheel part 11 after, as evident when considered with FIG. 1, the pressure plate 6 and the cage-like extension 15 are rigidly fastened to one another. Additional leaf springs 24a connect the second pressure plate 7 to the first pressure plate 6 and consequently, also through the leaf springs 25a, to the flywheel part 11.

Figure 7:
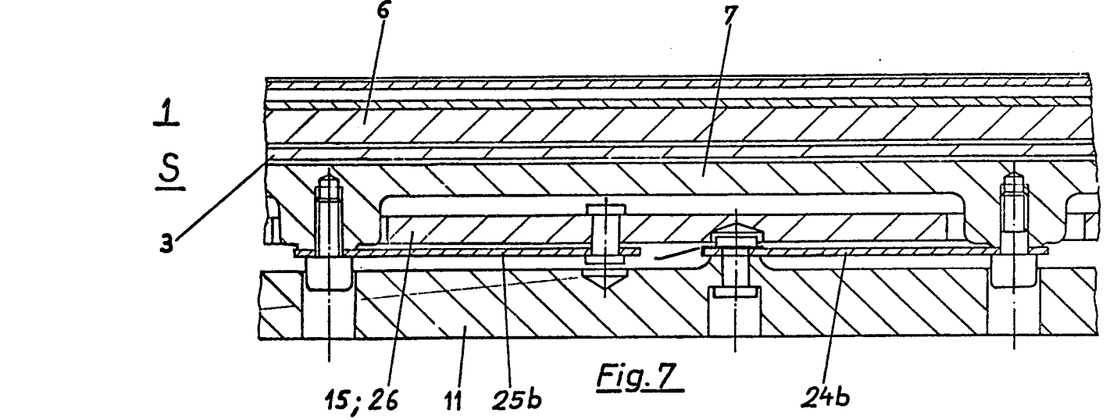

In the modified embodiment of FIG. 7, torque transmission between the pressure plates 6 and 7 and the flywheel part 11 is ensured through leaf springs 24b, 25b. In this regard, the leaf springs 25b connect the first pressure plate 6, via the cage-like extension 15 fastened thereto, to the second pressure plate 7 of the first clutch 1, and the leaf springs 24b the second pressure plate 7 to the flywheel part 11.

For starting the internal-combustion engine, the clutch 1 is disengaged; the clutch 2 may also possibly be disengaged unless the transmission is set in neutral. The clutch 1 can be disengaged i.e. the two pressure plates 6 and 7 can be lifted off the entrainer disc or drive plate 3, in accordance with the actuation of the ignition key. The starter motor 33 is then set in motion, the friction wheel 32 is moved in direction of the arrow 32b until its conical surface 32a engages the conical surface 31 and then the flywheel i.e. the flywheel part 11 with the clutch 2, and, by means of the leaf springs 24 and 25, the pressure plates 6 and 7 together with the cup spring 8, are accelerated to relatively high rotary speeds. By engaging the clutch 1 i.e., by coupling the flywheel, the engine is started.

Under such operating conditions, for example, driving conditions for a motor vehicle, wherein the drive wheels would drive the internal-combustion engine, for example, during so-called thrust or pushing operation as well as during stoppages resulting from traffic, the clutch 1 can be disengaged, and the internal-combustion engine can either continue to run at a lower speed or be stopped. In case the clutch 2 is also disengaged, the flywheel can continue to rotate and, if the speed thereof falls below a given speed, this flywheel can either be brought up again to a higher rotary speed by the starter and the friction wheel 32 or, however, by the internal-combustion engine per se and, when the speed falls below a given speed, the clutch 1 is engaged and the internal-combustion engine is again briefly started-up, until the flywheel is again brought up to the predetermined rotary speed and the clutch 1 is again disengaged and the internal-combustion engine stopped. The clutch 1 is re-engaged, the instant a power requirement by the internal-combustion engine again exists, and the internal-combustion engine is restarted.

The invention according to this application is not limited to the illustrated embodiment, as hereinaforementioned, but rather, the flywheel with the coupling 1 and the coupling 2 can be provided at various locations of the internal-combustion engine and/or at various rotary units or installations.

Furthermore, utility of the invention is not limited to motor vehicles, but rather, the invention can also be used with other units or installations driven by internal-combustion engines, such as heat pumps, for example, for setting in motion, starting up, intermittently operation or the like.

There are claimed:

1. The combination, comprising a flywheel couplable to and uncouplable from an internal combustion engine, depending upon specific circumstances, and a clutch for coupling the flywheel to and for uncoupling the flywheel from the internal combustion engine, said clutch comprising an entrainer disc secured to a rotatable part of the internal combustion engine against axial and rotary displacement relative thereto, said entrainer disc having two friction surfaces, a pair of pressure plates each having a respective opposing friction surface located on opposite sides of said entrainer disc, a cup spring actuatable for positively moving said pressure plates in opposite directions, said cup spring having a radially outer region operatively engageable with one of said pressure plates, and a radially farther inner region operatively engageable with the other of said pressure plates, an axially fixed tilting support of ring-shaped construction being disposed on an axially fixed part of the flywheel, said cup spring having a radial region disposed intermediate said radially outer and inner regions thereof and being tiltable at said intermediate radial region thereof about said axially fixed support, said flywheel part being mounted for relative rotation with the rotatable part of the internal-combustion engine, torque transmission means for transmitting torque between said flywheel part, on the one hand, and the pair of axially movable pressure plates of the clutch, and actuating means engaging said cup spring at radially inner regions thereof.

2. The combination according to claim 1 wherein said cup spring is installed with prestressing subjecting one of said pressure plates to tension and the other of said pressure plates to compression, the prestressing of said cup springloading said pressure plates in direction toward said entrainer disc.

3. The combination according to claim 1 wherein the one pressure plate is located toward the side of the internal-combustion engine and has a cage-like enlargement extending over said entrainer disc and the other pressure plate in axial direction.

4. The combination according to claim 3 wherein a support of the one pressure plate for said cup spring is provided on said cage-like enlargement and extends radially inwardly as a radial comtinuation over said friction surfaces.

5. The combination according to claim 4 wherein said torque transmission means are elastic in axial direction and stiff in circumferential direction so that said flywheel part, said cup spring and said pair of pressure plates form a unit rotatable relative to the rotatable part of the internal-combustion engine and said entrainer disc.

6. The combination according to claim 5 including another clutch mounted on said flywheel part and forming part of said unit.

7. The combination according to claim 5 wherein the one pressure plate has a cage-like enlargement with a radially inwardly extending continuation and said torque transmission means comprise leaf springs having fastening points for said one pressure plate located on said radially inwardly extending continuation, and the other pressure plate is formed with dogs extending through recesses formed in said radially inwardly extending continuation, the fastening points of said leaf springs for said other pressure plate being located on said dogs.

8. The combination according to claim 5 wherein said torque transmission means connect said one to said other pressure plate, and also said one pressure plate to said flywheel part.

9. The combination according to claim 5 wherein said torque transmission means connect said one to said other pressure plate, and also said other pressure plate to said flywheel part.

10. The combination according to claim 5 wherein said torque transmission means extend from said flywheel part to said one and to said other pressure plate.

11. The combination according to claim 1 wherein said torque transmission means engage said pressure plates and, simultaneously, exert a lifting force upon said pressure plates directed away from said entrainer disc.

12. The combination according to claim 1 wherein said tilting support disposed on said flywheel part is displaceable in axial direction on said flywheel part.

13. The combination according to claim 12 wherein said axially displaceable tilting support is adjustable in axial direction.

14. The combination according to claim 13 including screws provided in said flywheel part and engaging in said tilting support for adjusting said tilting support in axial position thereof.

15. The combination according to claim 1 including an antirotation device securing said flywheel part to said tilting support for preventing relative rotation therebetween.

16. The combination according to claim 1 wherein the flywheel is formed with a contact surface for a friction wheel of a starter.

17. The combination according to claim 16, wherein said contact surface is formed on a part of said flywheel which is axially fixed.

18. The combination according to claim 16 wherein said contact surface is conical, and said starter friction wheel is correspondingly conical and is axially displaceable into engagement therewith.

19. The combination according to claim 3 including two security systems respectively effective in axial and in circumferential direction, said security systems being fastened to the one pressure plate and form-lockingly engaging in said cage-like enlargement for mutually connecting said cage-like enlargement and the one pressure plate.

20. The combination according to claim 19 wherein said security system effective in axial direction comprises a plate-like member screwed to the side of the one pressure plate and projecting in radial direction into a groove formed in said cage-like enlargement.

21. The combination according to claim 19 wherein said security system effective in circumferential direction comprises claws screwed to the side of the one pressure plate and extending in radial direction and engaging in radially extending slots formed in said cage-like enlargement.

22. The combination according to claim 21 wherein said slots are wedge-shaped, as viewed in axial direction, and said claws are correspondingly shaped, said claws exerting an axial bracing force between said one pressure plate and said cage-like enlargement.

23. The combination according to claim 1 wherein one of the parts of said clutch is formed with a contact surface for a friction wheel of a starter.

24. The combination according to claim 6 wherein said other clutch has a cover, and said cover is formed with a contact surface for a friction wheel of a starter.

* * * * *